(12) United States Patent
Armstrong et al.

(10) Patent No.: US 11,468,127 B1
(45) Date of Patent: *Oct. 11, 2022

(54) DATA DELIVERY

(71) Applicant: Google LLC, Mountain View, CA (US)

(72) Inventors: Matthew A. Armstrong, Kirkland, WA (US); Matthew B. Tolton, Seattle, WA (US); Hossein Ahmadi, Kirkland, WA (US); Michael Entin, Redmond, WA (US)

(73) Assignee: Google LLC, Mountain View, CA (US)

( * ) Notice: Subject to any disclaimer, the term of this patent is extended or adjusted under 35 U.S.C. 154(b) by 696 days.

This patent is subject to a terminal disclaimer.

(21) Appl. No.: 16/291,284

(22) Filed: Mar. 4, 2019

Related U.S. Application Data

(63) Continuation of application No. 14/210,998, filed on Mar. 14, 2014, now Pat. No. 10,223,450.

(60) Provisional application No. 61/783,986, filed on Mar. 14, 2013.

(51) Int. Cl.
*G06F 16/93* (2019.01)
*G06F 16/95* (2019.01)

(52) U.S. Cl.
CPC .................. *G06F 16/95* (2019.01)

(58) Field of Classification Search
CPC ......... G06F 2212/60; G06F 2209/5017; H04L 47/34; H04L 49/9057; G06Q 30/00
USPC .. 707/607–608, 636, 682, 764, 770, 17.032, 707/17.033, 17.035
See application file for complete search history.

(56) References Cited

U.S. PATENT DOCUMENTS

| | | |
|---|---|---|
| 4,633,486 A | 12/1986 | Berlekamp |
| 5,115,428 A | 5/1992 | Ramanan |
| 5,423,015 A * | 6/1995 | Chung ............... G06F 7/24 711/108 |
| 6,545,623 B1 | 4/2003 | Yu |
| 6,580,721 B1 | 6/2003 | Beshai |

(Continued)

OTHER PUBLICATIONS

Chang et al. "Bigtable: A Distributed Storage System for Structured Data", Published in 2006, 14 pages.

(Continued)

*Primary Examiner* — Alex Gofman
*Assistant Examiner* — Linh Black
(74) *Attorney, Agent, or Firm* — Honigman LLP; Brett A. Krueger

(57) ABSTRACT

This disclosure generally relates to data delivery in distributed applications. One example method includes identifying a data source associated with a shuffle operation, the data source configured provide data from a data set associated with the shuffle operation; identifying a data sink associated with the shuffle operation, the data sink configured to receive data provided by the data source; associating a shuffler component with the shuffle operation, the shuffler component configured to receive data from the data source and provide the data to the data sink; receiving, by the shuffler component, a first data portion from the data source; providing, by the shuffler component, the first data portion to the data sink; receiving, by the shuffler component, a second data portion from the data source, the second data portion being received from the data source prior to or concurrent with providing the first data portion to the data sink.

20 Claims, 10 Drawing Sheets

(56) References Cited

U.S. PATENT DOCUMENTS

| | | | |
|---|---|---|---|
| 7,205,917 B2* | 4/2007 | Magrath | H03M 7/302 |
| | | | 341/143 |
| 7,941,739 B1 | 5/2011 | Mohammed | |
| 8,280,860 B2 | 10/2012 | Spackman | |
| 8,510,534 B2 | 8/2013 | Van Berkel | |
| 9,495,427 B2* | 11/2016 | Abadi | G06F 16/2471 |
| 2001/0006522 A1* | 7/2001 | Beshai | H04L 47/24 |
| | | | 370/380 |
| 2002/0062463 A1* | 5/2002 | Hines | G06F 9/465 |
| | | | 714/38.14 |
| 2002/0126998 A1* | 9/2002 | Shima | H04N 5/9264 |
| | | | 386/231 |
| 2004/0032950 A1 | 2/2004 | Graunke | |
| 2004/0073769 A1* | 4/2004 | Debes | G06T 1/60 |
| | | | 711/217 |
| 2004/0073771 A1* | 4/2004 | Chen | G06T 1/60 |
| | | | 711/218 |
| 2004/0093554 A1 | 5/2004 | Hung | |
| 2004/0103279 A1 | 5/2004 | Alten | |
| 2004/0262322 A1 | 12/2004 | Middleton | |
| 2006/0158359 A1* | 7/2006 | Magrath | H03M 3/506 |
| | | | 341/143 |
| 2007/0067373 A1* | 3/2007 | Higgins | G06F 11/3013 |
| 2007/0156679 A1 | 7/2007 | Kretz | |
| 2007/0236372 A1 | 10/2007 | Lin | |
| 2008/0186976 A1* | 8/2008 | Axnas | H04L 1/04 |
| | | | 370/390 |
| 2008/0189512 A1* | 8/2008 | Hansen | G06F 9/30007 |
| | | | 712/1 |
| 2008/0256341 A1 | 10/2008 | Weisberg | |
| 2009/0031185 A1 | 1/2009 | Xhafa | |
| 2009/0177989 A1* | 7/2009 | Ma | H04N 5/44591 |
| | | | 715/766 |
| 2009/0313668 A1* | 12/2009 | Shepherd | H04N 19/172 |
| | | | 725/109 |
| 2010/0011054 A1 | 1/2010 | Pan | |
| 2010/0268918 A1* | 10/2010 | Priewasser | H03M 13/6513 |
| | | | 712/E9.016 |
| 2011/0138314 A1 | 6/2011 | Mir | |
| 2011/0319104 A1 | 12/2011 | Williams | |
| 2012/0209413 A1 | 8/2012 | Xu | |
| 2012/0209414 A1* | 8/2012 | Song | G11B 19/02 |
| | | | 700/94 |
| 2013/0083722 A1* | 4/2013 | Bhargava | H04W 88/04 |
| | | | 370/315 |
| 2013/0106873 A1 | 5/2013 | Andrews | |
| 2015/0301692 A1 | 10/2015 | Patsiokas | |

OTHER PUBLICATIONS

Condie et al., "MapReduce Online", Oct. 2009, 15 pages.
Dean et al., "MapReduce: A Flexible Data Processing Tool", Communications of the ACM, vol. 53, No. 1, Jan. 2010, 5 pages.
Dean et al., "MapReduce: Simplified Data Processing on Large Clusters", USENIX Association—OSDI '04: 6th Symposium on Operating Systems Design and Implementation, published in 2004, pp. 137-149.
Graefe, "Encapsulation of Parallelism in the Volcano Query Processing System", Mar. 1990, 14 pages.
Pavlo et al., "A Comparison of Approaches to Large-Scale Data Analysis", SIGMOD '09, Jun. 29-Jul. 2, 2009, 14 pages.

\* cited by examiner

DATA DELIVERY

CROSS REFERENCE TO RELATED APPLICATIONS

This application is a continuation of U.S. application Ser. No. 14/210,998, filed Mar. 14, 2014, which claims the benefit of U.S. Provisional Application No. 61/783,986, filed Mar. 14, 2013, which is hereby incorporated by reference.

TECHNICAL FIELD

This disclosure relates to data delivery in distributed applications.

BACKGROUND

Large-scale data processing may include data delivery from a data source to various clients. Data delivery mechanisms may also be used in distributed architectures, such as distributed databases or cloud-based systems.

SUMMARY

The present disclosure describes computer-implemented methods, systems and computer-readable media including instructions related to data delivery in distributed applications.

In one aspect, a computer-implemented method performed by one or more processors includes identifying a data source associated with a shuffle operation, the data source configured to provide data from a data set associated with the shuffle operation; identifying a data sink associated with the shuffle operation, the data sink configured to receive data provided by the data source; associating a shuffler component with the shuffle operation, the shuffler component configured to receive data from the data source and provide the data to the data sink; receiving, by the shuffler component, a first data portion from the data source; providing, by the shuffler component, the first data portion to the data sink; and receiving, by the shuffler component, a second data portion from the data source, the second data portion being received from the data source prior to or concurrent with providing the first data portion to the data sink.

Implementations of this aspect may include one or more of the following features. The shuffle operation may be a first shuffle operation, the data source may be a first data source, the data sink may be a second data source associated with a second shuffle operation, the shuffler component may be a first shuffler component, and the method may include associating a second shuffler component with the second shuffle operation; and receiving, by the second shuffler component, a third data portion from the second data source, the third data portion being received from the second data source prior to or concurrent with receiving, by the first shuffler component, the second data portion from the first data source. The method may also include receiving, by the shuffler component, a plurality of additional data portions from the data source; and providing, by the shuffler component, the plurality of additional data portions to the data sink, wherein providing the plurality of additional data portions at least partially overlaps with receiving the plurality of additional data portions. In some implementations, the method may include receiving, by the shuffler component, a final data portion from the data source prior to providing the first data portion to the data sink. The method may also include providing, by the second shuffler component, the first data portion to a second data sink associated with the second shuffle operation. In some cases, the method includes receiving, by the shuffler component, a flow control indication from the data sink; and suspending the providing of the additional data portions to the data sink in response to receiving the flow control indication. The method may also include receiving, by the shuffler component, a flow resume indication from the data sink; and resuming the providing of the additional data portions to the data sink in response to receiving the flow resume indication.

In another aspect, a computer-implemented method performed by one or more processors includes identifying a data source associated with a shuffle operation, the data source configured to provide data from a data set associated with the shuffle operation; identifying a data sink associated with the shuffle operation, the data sink configured to receive data provided by the data source; associating a first shuffler component with the shuffle operation, the first shuffler component configured to receive data from the data source and provide the data to the data sink; creating a first sink log associated with the first shuffler component, the first sink log configured to store data received from the data source and provide the stored data to the data sink; determining that an additional shuffler component should be associated with the shuffle operation; in response to determining that an additional shuffler component should be associated: associating a second shuffler component with the shuffle operation; and creating a second sink log associated with the second shuffler component, the first sink log configured to store data received from the data source and provide the stored data to the data sink.

Implementations of this aspect may include one or more of the following features. The method may include receiving a data item from the data source at the first shuffler component; storing the data item in the first sink log; receiving the data item from the data source at the second shuffler component; and storing the data item in the second sink log. In some cases, the data sink is configured to receive data from the first sink log and the second sink log. In some implementations, the data sink may be a first data sink, and the method may include receiving, at the first data sink, data from the first sink log and the second sink log, the data being in a first order; and receiving, at a second data sink, data from the first sink log and the second sink log, the data being in a second order, wherein the first order and the second order are the same. In some cases, determining that an additional shuffler component should be associated with the shuffle operation includes detecting a performance problem associated with the shuffle operation. The performance problem may include a loss of network connectivity associated with the first shuffler component. In some implementations, the performance problem includes detecting a high load condition associated with the first shuffler component.

In another aspect, a computer-implemented method performed by one or more processors includes receiving a data item from a data source associated with a shuffle operation; determining that an asynchronous mode setting is enabled; designating the data item to be stored to a storage system; and sending to the data source an acknowledgement of successful receipt of the data item, the acknowledgement being sent before the data item is stored in the storage system.

Implementations of this aspect may include one or more of the following features. The method may include determining that an asynchronous mode setting is disabled; storing the data item in the storage system; and sending to the data source an acknowledgement of successful receipt of the data item, the acknowledgement being sent after the data item is stored in the storage system. In some cases, the data item is a first data item, and the method includes receiving a request to disable the asynchronous mode setting from the data source, the request including a second data item; designating the second data item to be stored to the storage system; waiting for all previously designated data items to be stored to the storage system; and sending an acknowledgement to the data source after all previously designated data items are stored in the storage system. In some cases, if the asynchronous mode setting is enabled, the method includes receiving an acknowledgement that the data item has been stored in the storage system after sending to the data source the acknowledgement of successful receipt of the data item. In some implementations, the data item is a first data item, and the method includes if the asynchronous mode setting is enabled: receiving a second data item from the data source prior to receiving an acknowledgement that the first data item has been stored in the storage system. In some cases, the asynchronous mode setting is associated with the shuffle operation.

In another aspect, a computer-implemented method performed by one or more processors includes receiving, by a shuffler component, a data item from a data source associated with a shuffle operation; storing the received data item in a buffer associated with the shuffler component and a data sink; and sending, by the shuffler component, an acknowledgement to the data source, the acknowledgement indicating to the data source that the data has been buffered by the shuffler and can be deleted by the data source.

Implementations of this aspect may include one or more of the following features. In some cases, the received data item is maintained in the buffer if the data source fails. In some implementations, storing the received data item in the buffer includes storing the received data item in a cache memory associated with the shuffler component. Storing the received data item in the buffer may include storing the received data item in a data storage system separate from the shuffler component. In some cases, the data storage system comprises a distributed file system. The method may include determining if the buffer includes an amount of data greater than a threshold; and storing the contents of the buffer to a persistent data storage system if the amount of data is greater than the threshold. In some cases, the method includes providing the received data item from the buffer to a data sink; and removing the received data item from the buffer in response to providing the received item to the data sink. The method may also include determining a maximum amount of memory associated with the shuffler component to use for the buffer; determining that an amount of memory used by the buffer is greater than or equal to the maximum amount of memory; storing at least a portion of the data from the buffer to a persistent storage system; and removing the portion of the data stored to the persistent storage system from the buffer.

DETAILED DESCRIPTION

In general, the techniques described in this document can be applied to large-scale data processing and, in particular, to large scale data retrieval operations. In some implementations, the techniques may be applied to distributed database applications involving the retrieval and processing of large data sets. The techniques may also be applied to distributed database applications designed to produce large amounts of associated data quickly. One such application is a column-oriented or "columnar" database application. In such an application, data for each column of a table is stored such that it can be produced quickly, as opposed to the more common organization scheme where data associated with each record or "row" of the table can be produced quickly. Columnar databases are generally used for applications involving selection of large sets of data rather than individual records. By storing each column in a format for quick production, a selection of a large data set including multiple columns can also be parallelized across multiple components, since the values for each column can be selected independently from the others and the records reassembled later if necessary. The techniques described herein may be used to provide increased speed and flexibility for data retrieval in such applications. The techniques described herein may also be applied to row-oriented database, object-oriented databases, distributed databases, non-distributed databases, and to any other suitable application or system.

Figure 1:
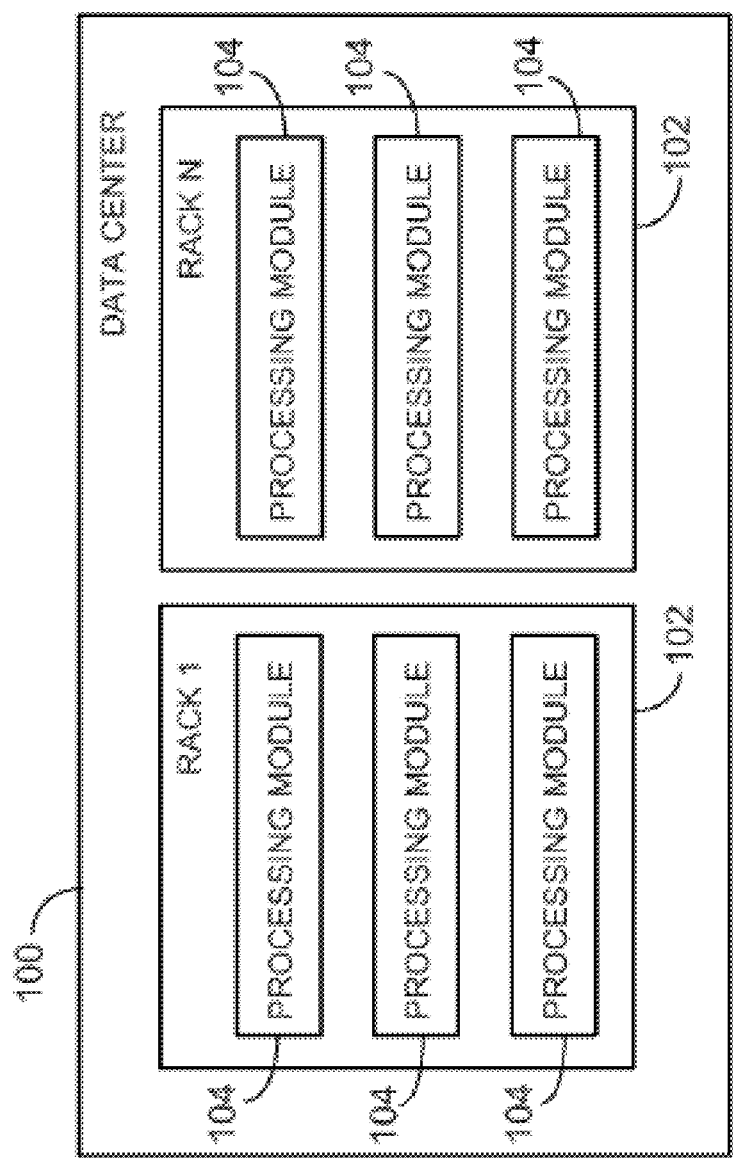
FIG. 1 is a block diagram illustrating an example of a datacenter.

FIG. 1 is a block diagram illustrating an example of a datacenter 100. The datacenter 100 is used to store data, perform computational tasks, and transmit data to other systems outside of the datacenter using, for example, a network connected to the datacenter. In particular, the datacenter 100 may perform large-scale data processing on massive amounts of data.

The datacenter 100 includes multiple racks 102. While only two racks are shown, the datacenter 100 may have many more racks. Each rack 102 can include a frame or cabinet into which components, such as processing modules 104, are mounted. In general, each processing module 104 can include a circuit board, such as a motherboard, on which a variety of computer-related components are mounted to perform data processing. The processing modules 104 within each rack 102 are interconnected to one another through, for example, a rack switch, and the racks 102 within each datacenter 100 are also interconnected through, for example, a datacenter switch.

In some implementations, the processing modules 104 may each take on a role as a master or slave. The master modules control scheduling and data distribution tasks amongst themselves and the slaves. A rack can include storage (e.g., one or more network attached disks) that is shared by the one or more processing modules 104 and/or each processing module 104 may include its own storage. Additionally, or alternatively, there may be remote storage connected to the racks through a network.

The datacenter 100 may include dedicated optical links or other dedicated communication channels, as well as supporting hardware, such as modems, bridges, routers, switches, wireless antennas and towers, and the like. The datacenter 100 may include one or more wide area networks (WANs) as well as multiple local area networks (LANs).

Figure 2:
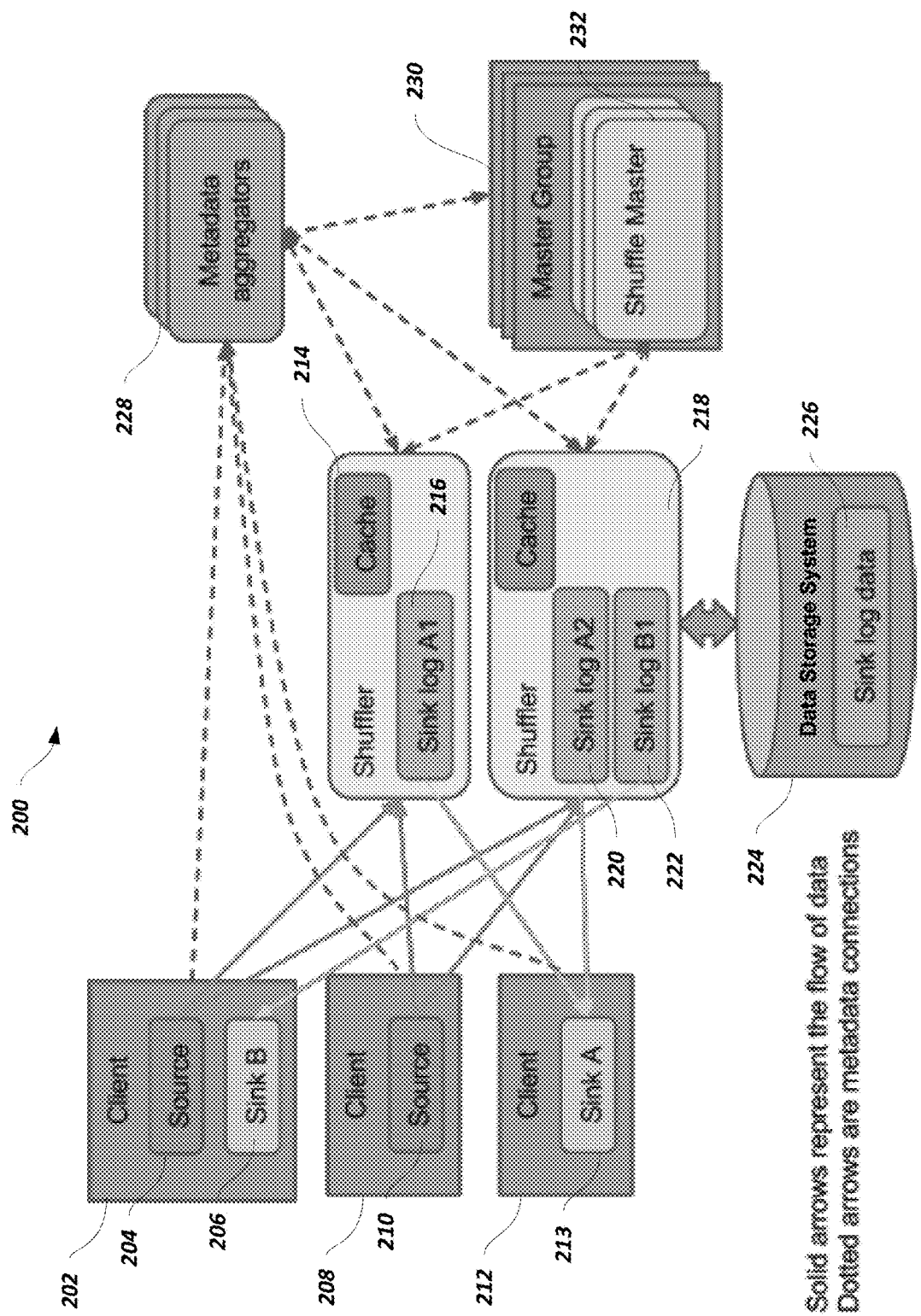
FIG. 2 is a block diagram of an example of a data delivery system.

FIG. 2 is a block diagram of an example of a data delivery system 200. Generally, the data delivery system 200 is configured to deliver data from one or more data sources to one or more data sinks. This delivery of data from a set of data sources to a set of data sinks is a shuffle operation. The data delivery system 200 performs each shuffle operation utilizing one or more shuffler components. The shuffler components receive data from the data sources associated with the shuffle operation and store this data in one or more sink logs. The data sinks associated with the shuffle operation request the data from the shuffler components. The shuffler components then send the data to the data sinks.

For example, in the illustrated system 200, data source 204 and data sink 213 are associated with a shuffle operation utilizing shuffler component 214. The shuffler component 214 has created sink log 216 to store data received from data source 204. Data source 204 may provide "chunks" (portions of the data set associated with the shuffle operation) to the shuffler component 214. In some implementations, the data source 204 may store each chunk sent to the shuffler component in a buffer after sending. When the shuffler component 214 receives and stores a chunk, it may acknowledge the data source 204 and cause the data source 204 to delete the chunk from its buffer. In some implementations, the shuffler component 214 may acknowledge the chunk prior to storing the data to persistent storage (as described relative to FIG. 7). Data source 204 may continue to provide data to the shuffler component 214, regardless of whether any data has been sent to data sink 213. The shuffler component 214 may store the data received from the data source 204 in sink log 216. During the shuffle operation, data sink 213 may request data associated with the shuffle operation from the shuffler component 214. If the shuffler component 214 has data stored in sink log 216, it provides at least a portion of this data to the data sink 213 in response to the request. Data source 204 may continue to provide data to the shuffler component 214 until it has provided all data associated with the shuffle operation. Data sink 213 may continue to request and receive data from the shuffler component 214 until it has received all data associated with the shuffle operation. When all data associated with the shuffle operation has been received by the data sink, the shuffle operation is complete.

As shown, the data delivery system 200 includes a plurality of clients 202, 208, and 212. In some implementations, the clients 202, 208, and 212 may be nodes within a distributed system. The clients 202, 208, 212 may be separate computing devices connected to a network and each including processing and storage resources. In some cases, the clients 202, 208, and 212 may be nodes or shards of a distributed database, and may store a set of data associated with the distributed database. The clients 202, 208, and 212 may also be software applications running on the same or disparate computing devices. In some implementations, the clients 202, 208, and 212 may be software processes executing on the processing module 104 of the data center 100 described relative to FIG. 1.

In the illustrated implementation, the data delivery system 200 includes multiple data sources 204 and 210, associated with clients 202 and 208 respectively. The data sources 204 and 210, generally, produce data for consumption by the one or more data sinks 206 and 213 as part of a shuffle operation. In some implementations, the data sources 204 and 210 may be database engines running on the respective clients 202 and 208, and associated with a distributed database, such as a columnar database. The data sources 204 and 210 may identify a set of data associated with the shuffle operation to provide to the data sinks 206 and 213. In some implementations, the set of data may be identified by a query, such as a Structured Query Language (SQL) query. The query identifying the set of data may be associated with the shuffle operation. The set of data may also include the entire set of data associated with the particular data source. In some implementations, the data sources 204 and 210 may not be associated with a particular set of data, and may be processes that mine data from a data store as part of a shuffle operation.

In some implementations, the data sources 204 and 210 may be software processes running on the one or more processing modules 104 described relative to FIG. 1. The data sources 204 and 210 may also utilize persistent storage resources attached to or accessible by the processing modules 104 to retrieve data associated with the shuffle operation. In some implementations, the data on the persistent storage resources may be stored in a database, a shard of a distributed database, a file system, or in some other storage mechanism.

The data delivery system 200 also includes a plurality of data sinks 206 and 213. Generally, data sinks consume data produced by data sources. For example, in the illustrated implementation, data sink 206 consumes data from source 210 (via sink log 222 associated with shuffler component 218), and data sink 213 consumes data from data sources 204 and 210 (via sink logs 216 and 220 associated with shuffler components 214 and 218). In some implementations, the data sink 206 may perform an operation on the data it consumes from the data sources. For example, the data sink 206 may receive multiple streams of data from multiple data sources, and perform a join operation using the multiple streams of data to produce an output data set including data from the different streams. In another example, the data sink 206 may transform or filter data received from the data sources, and may itself, in turn, provide a data stream to other sinks as part of another shuffle operation.

In some implementations, the data sinks 206 and 213 may be software programs running on one or more servers that have queried a set of data associated with the data sources 204 and 210. The data sinks 206 and 213 may also be any other type of component configured to receive the data stream provided by the data sources 204 and 210. Such components may include, but are not limited to, database engines, software libraries, shuffler components associated with other shuffle operations, servers or services external to the data delivery system 200, or any other suitable component or combination of components. In some implementations, data sinks 206 and 213 may be included inside a single software process. In some implementations, the data sinks 206 and 213 may be software processes running on the one or more processing modules 104 of the data center 100 discussed relative to FIG. 1.

As shown in FIG. 2, the data delivery system 200 also includes a plurality of shuffler components 214 and 218. Generally, shuffler components facilitate delivery of data from data sources to data sinks. In some implementations, the shuffler components 214 and 218 are software programs that receive data from the data sources 204 and 210, such as over a network. The shuffler components 214 and 218 may also be a combination of software and hardware components.

In the illustrated implementation, the shuffler components 214 and 218 each include a cache (215 and 219 respectively). In some implementations, the shuffler components 214 and 218 initially store data received from the one or more data sources 204 and 210 into the caches 215 and 219, respectively. The caches 215 and 219 may be a high-speed form of storage allowing for quick access to the data, such as Random Access Memory (RAM) or flash storage. The caches 215 and 219 may also be hard drives or other storage associated with the shuffler components 214 and 218. For example, shuffler component 214 may be associated with a computing device, and the cache 215 may include a hard drive associated with that computing device.

In operation, the shuffler components 214, 218 store data received from the data sources 204, 210 in caches 215, 219 in the form of sink logs 216, 220, 222. In some implementations, the sink logs 216, 220, 222 store the data received from the data sources 204, 210 in the order it was received, or in some other order associated with the data itself. For example, if a data source is providing data that is inherently ordered, such as with each data segment being associated with a sequence number, the data may be stored in the sink log in order according to the sequence number. In some instances, a sink log may include data from multiple data sources. For example, sink log 216 associated with shuffler component 214 includes data received from data source 204 and data source 210. The shuffler component 214 may examine the data as it is received in order to store it in the sink log 216 in the order it should be presented to the data sink 213. In some implementations, the shuffle components 214, 218 may insert data received from the data sources 204, 210 onto the end of the sink logs 216, 220, 222, and may provide data to the data sinks 206, 213 from the beginning of the sink logs 216, 220, 222. In such implementation, sink logs 216, 220, 222 operate as First-In-First-Out (FIFO) queues, such that data is provided to the data sinks 206, 213 in the order is received by the shuffler components 214, 218.

In some implementations, the shuffler components may be software processes running on the processing modules 104 of data center 100 as described relative to FIG. 1. In such implementations, the sink logs 216, 220, 222 may be implemented as data structures in persistent or dynamic storage associated with processing modules 104. The sink logs 216, 220, 222 may be implemented as files in a file system, tables within a database, collections of tables with a database, objects or data structures within a program, or as any other suitable structure.

In some implementations, multiple sink logs may be associated with a single shuffle operation. For example, sink logs 216 and 220 are associated with a shuffle operation including data sources 204 and 210 and data sink 213. In some instances, the sink logs 216 and 220 may be "replicas" including data from the same data set. In such a case, data sink 213 consults both sink log to receive the data associated with a shuffle operation, as the sink logs 216 and 220 include different portions of the data set associated with shuffle operation.

In some implementations, the data delivery system 200 may also include a data storage system 224 for storing sink log data 226. Generally, the shuffler components 214 and 218 will attempt to store sink log data in their associated cache memory so the data can be provided to the data sinks quickly. However, when the sink log data exceeds the size of the associated cache memory, the shuffler components 214 and 218 may store additional sink log data in the data storage system 224 as sink log data 226. In some implementations, the shuffler components 214 and 218 may begin to store sink log data in the data storage system 224 when cache memory usage reaches a certain threshold. The data storage system 224 may be any suitable storage system, including, but not limited to, a distributed database, a distributed file system, a cloud storage system, or any other suitable storage system or a combination of storage systems.

As shown, the data delivery system 200 also includes one or more master groups 230, each including one or more shuffle masters 232. Generally, a master group provides a known location where shuffle masters may be created. This may allow programs in the network to communicate with shuffle masters without previously being informed of their location. The one or more shuffle masters 232 coordinate shuffle operations. In some implementations, each shuffle operation is associated with a single shuffle master, which is in charge of allocating and associating a shuffler component with shuffle operation, and associating the various data sources and data sinks with that shuffler component. In some cases, the shuffle masters 232 may not allocate shuffler components in response to the creation of shuffle operations, and instead may choose a shuffler component from a pool of already running shuffler components.

In some implementations, the shuffle masters 232 may be associated with and co-located with a program that created the shuffle operation, for example, a software program may request that a shuffle operation take place, and in the process may create a shuffle master. This created shuffle master may be created as an object inside the requesting program. In other implementations, the shuffle masters 232 may be associated with a server or set of servers, and may be co-located with or on different servers than the other components of data delivery system 200.

The data delivery system 200 also includes one or more metadata aggregators 228. The metadata aggregators 228 collect and maintain information about the state of each shuffle operation, including the location of the associated shuffle master, and all shuffler components handling various data sinks and associated with the various data sources. In the illustrated implementation, the metadata aggregators 228 receive metadata information from the various components, represented by dashed lines in FIG. 2. This metadata may be exchanged as messages on a network, as data inserted from a common database, or by any other suitable mechanism. In some implementations, the metadata may be exchanged according to one or more standard protocols, including, but not limited to, Simple Network Management Protocol (SNMP) or any other suitable protocol.

In some implementations, the metadata aggregators 228 allow clients to set watches for the occurrence of specific key prefixes in the generated metadata. If one of the key prefixes occurs, the metadata aggregator notifies the client that configured the watch that the key prefix has occurred. In some implementations, the metadata aggregator may notify the client by sending the client an indication over the network.

Figure 3A:
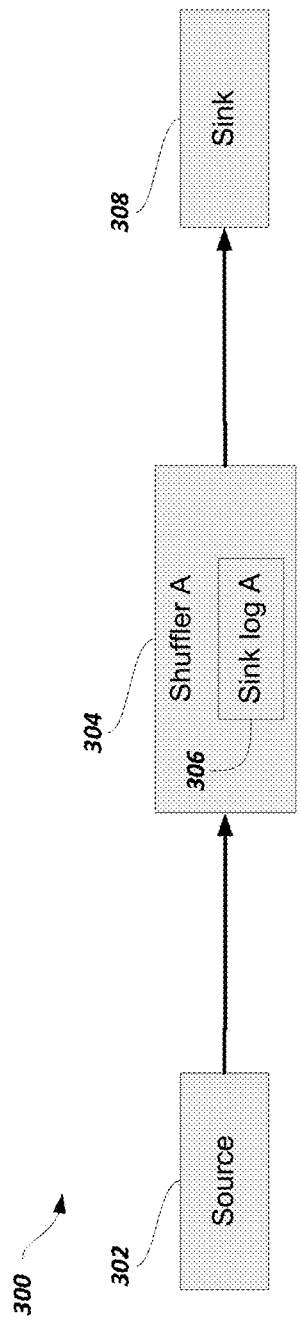
FIG. 3A is a block diagram illustrating an example of a system for performing a shuffle operation.

FIG. 3A is a block diagram illustrating an example of a system 300 for performing a shuffle operation. Generally, FIG. 3A shows a simplified view of a portion of the system 200 depicted in FIG. 2. Whereas the system 200 depicted in FIG. 2 includes multiple sources, multiple sinks, and multiple clients, the system 300 of FIG. 3A includes a single data source 302, a single shuffler component 304 storing a single sink log 306, and a single data sink 308. In operation, the data source 302 may provide the shuffler component 304 with one or more chunks of data representing the data set associated with the shuffle operation. The shuffler component 304 may store these chunks in the sink log 306, and may acknowledge receipt of storage of these chunks to the source 302. In some implementations, the sink log 306 may be stored in an external data storage system, such as the data storage system 224 from FIG. 2. The data sink 308 may request chunks associated with the shuffle operation from the shuffler component 304. In some implementations, shuffler component 304 provides the sink 308 with the next chunk from the sink log 306 in response to a request from the sink 308.

In some implementations, the chunks sent by the data source 302 may include a cyclic redundancy check (CRC) code used to verify the successful transmission of the data portion. In some cases, the shuffler component 304 and/or the data sink 308 may verify successful receipt of each chunk by checking the included CRC code.

Figure 3B:
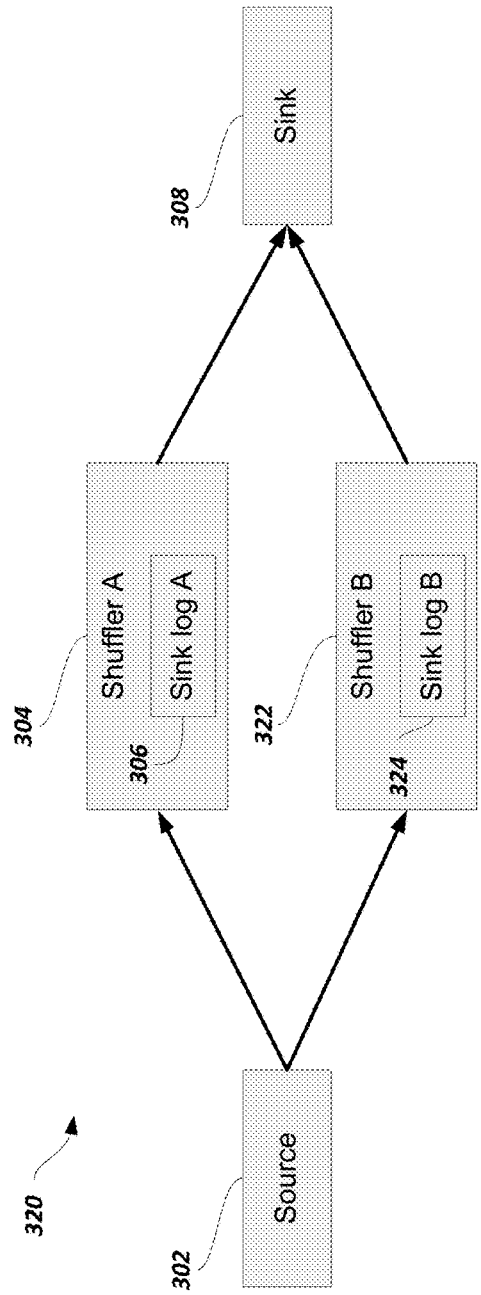
FIG. 3B is a block diagram illustrating an example of a system for performing a shuffle operation including an additional sink log.

FIG. 3B is a block diagram illustrating an example of a system 320 for performing a shuffle operation including an additional sink log. Generally, the system 320 includes the components of the system 300 described relative to FIG. 3A, with the addition of a second shuffler component 322, and a second sink log 324.

In some implementations, the second shuffler component 322 may be associated with the shuffle operation in response to a detected performance problem. For example, the sink 308 may be experiencing delays in receiving requested sink log data from the shuffler component 304. In such a case, these delays may indicate a hardware problem associated with shuffler component 304, a network connectivity problem between the sink 308 in the shuffler component 304, a heavy load condition associated with shuffler component 304, or any other problem, issue, or condition that may cause a delayed or inadequate response from the shuffler component 304. In some implementations, such a condition may be indicated by metadata sent from the various components of the system to the metadata aggregators, as described relative to FIG. 2. In some implementations, a delay experienced by the sink 308 may be defined as the shuffler component taking longer than a specified amount of time to respond to a request for data. The delay experienced by the sink 308 may also be defined as a certain number of delayed responses from the shuffler component 304 in a certain amount of time. For example, a delay may be identified when the shuffler component 304 takes more than one second to respond to requests for data from the sink 308 five times within a one minute period.

In some cases, the shuffler components 304 and 322 may each process only a portion of the data from source 302 associated with the shuffle operation. In such a case, the sink 308 should request chunks from both shuffler component 304 and shuffler component 322 in order to complete the shuffle operation.

In some implementations, the shuffler component 322 may be identified as providing better performance than the shuffler component 304 because the shuffler component 322 has an average response time to request for data that is better than the shuffler component 304. For example, if the shuffler component 322 has a 10 millisecond average response time and the shuffler component 304 as a 100 millisecond average response time, the shuffler component 322 is providing better performance than the shuffler component 304. In such a case, the sink 308 may observe that the shuffler component 322 is providing better performance at present, and may direct its requests for data to the shuffler component 322 instead of the shuffler component 304.

Figure 4:
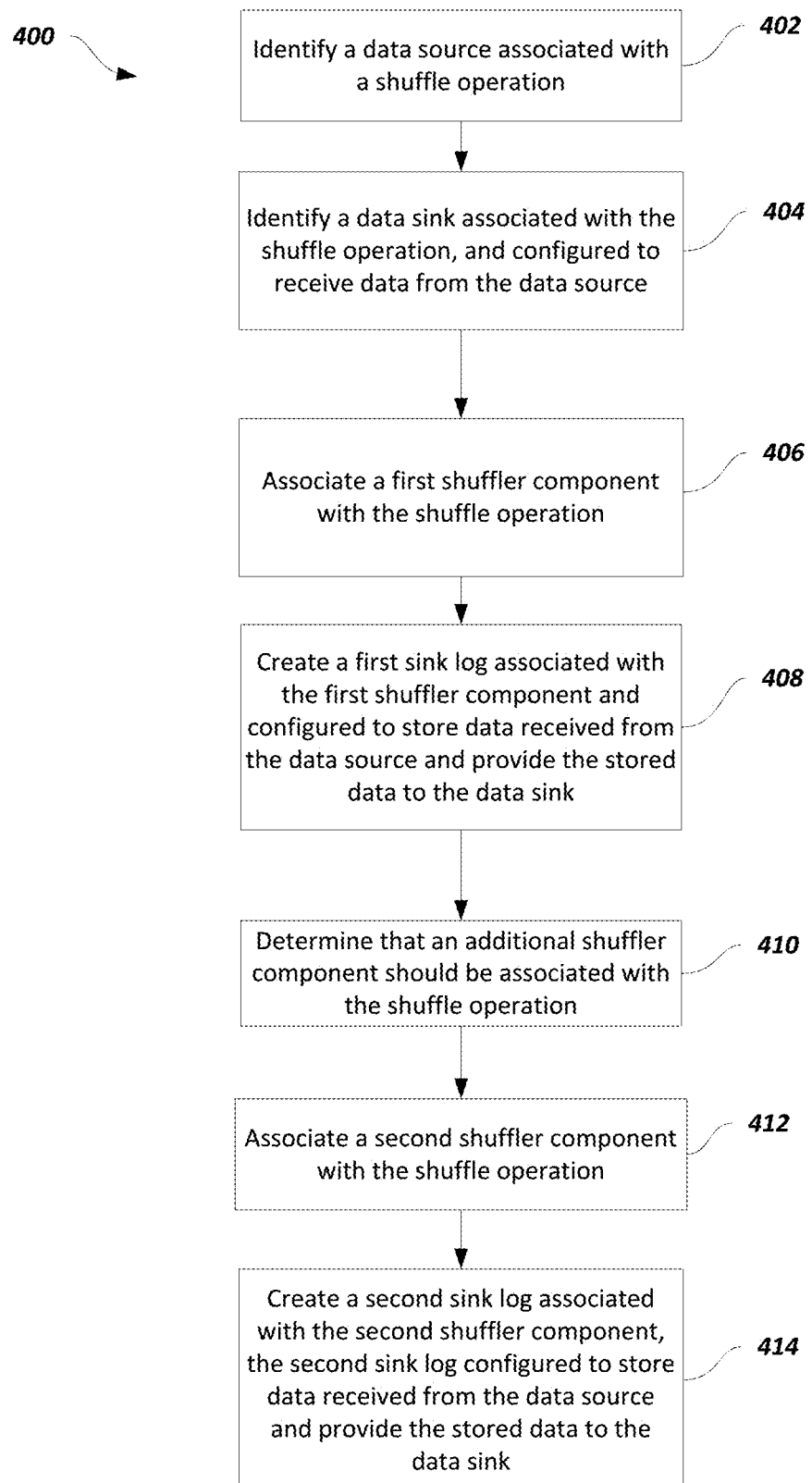
FIG. 4 is a flow chart illustrating an example of a method for creating an additional sink log upon detection of a performance problem.

FIG. 4 is a flow chart illustrating an example of a method 400 for creating an additional sink log upon detection of a performance problem. Generally, the method 400 detects a performance problem associated with the first shuffler component during a shuffle operation, and associates a second shuffler component with the shuffle operation to attempt to alleviate the performance problem.

At 402, a data source associated with the shuffle operation is identified. In some implementations, the data source may be identified when the shuffle operation is created. The data source may also be identified by consulting a shuffle master associated with shuffle operation. At 404, the data sink associated with the shuffle operation and configured to receive data from the data source is identified. The data sink may be identified in a manner similar or identical to the data source, or in any other suitable manner.

At 406, a first shuffler component is associated with the shuffle operation. In some implementations, the first shuffler component may be allocated to the shuffle operation from a pool of already-running shuffler components. The first shuffler component may also be initialized prior to being associated with the shuffle operation. In some cases, the first shuffler component is associated with shuffle operation by a shuffle master.

At 408, a first sink log is created associated with the first shuffler component and configured to store data received from the data stores, and provide the stored data to the data source. In some implementations, the first sink log may be created in a memory associated with the first shuffler component, such as RAM, flash storage, or a hard drive. The first sink log may also be created on a data storage system separate from and external to the first shuffler component, such as the data storage system 224 described relative to FIG. 2. As described previously, the first sink log may store data received from the data source until it is requested by the data sink.

At 410, a performance problem is detected associated with the first sink log. In some implementations, the performance problem may be a response delay (e.g., a response that takes over a certain amount of time to be received) experienced by the data sink when requesting data from the first shuffler component. The performance problem may also be a high usage level on one or more components associated with the first shuffler component. For example, an indication of high processor usage (e.g., greater than 90%) may indicate a performance problem. In some cases, the usage level of a component is considered high when one or more metrics exceeds a pre-configured threshold, such as, for example, the network utilization of a shuffler component exceeding 90%. In some cases, the performance problem may be a delay experienced by the data source in interacting with the first shuffler component. The performance problem may also be the first shuffler component exceeding a threshold associated with one or more performance metrics. For example, a performance problem may be identified by memory usage associated with the first shuffler component exceeding a preconfigured threshold, such as 90%. In some instances, the performance problem may be an indication that the shuffle operation could be completed more quickly if additional shuffler components were dedicated to it. For example, in the case of a data sink requesting data from the first shuffler component at a higher rate than the shuffler component can provide the data, it may be determined that the first shuffler component is a bottleneck in the shuffle operation. In such a case, the shuffler component may be treated as having a performance problem even when its response time and performance metrics are within normal tolerances. In this way, the method can optimize performance of shuffle operations. For example, if a data sink is requesting data from the first shuffler component at a rate of three requests per second, and the shuffler component is currently handling requests at a rate of two requests per second, the shuffler component may be determined to be a bottleneck to the shuffle operation and thus a performance problem.

In some implementations, the performance problem may be detected by the data sink. Performance problem may also be detected by a shuffle master associated with the shuffle operation. In some cases, the performance problem may be detected by an external component, such as a monitoring application. The performance problem may also be detected by a client or other application using information provided by the metadata aggregator component.

At 412, a second shuffler component is associated with the shuffle operation. In some implementations, the second shuffler component is associated with the shuffle operation in the same manner described at 406. The second shuffler component may also be selected from a group of shuffler components known to not currently have performance problems. At 414, a second sink log is created. The second sink log is associated with the second shuffler component and configured to store data received from the data stores and provide the stored data to the data source. In some implementations, the second sink log is a replica of the first sink log, such that the data sink can request data associated with the shuffle operation from either the first shuffler component of the second shuffler component. The second sink log may also contain different data than the first sink log, such as in the case where the first shuffler component and the second shuffler component are load sharing the data for the shuffle operation. For example, the data source may be configured to provide a first portion of the data associated with the shuffle operation to the first shuffler component, and a second portion of the data associated with the shuffle operation to the second shuffler component. In such a case, the data sink would have to request data from both the first shuffler component and the second shuffler component in order to complete the shuffle operation. In some implementations, the second shuffler component is associated with the shuffle operation and the second sink log is created in response to the detection of a performance problem. The second shuffler component may also be associated with the shuffle operation and the second sink log created in response to a determination that a second shuffler component should be added to the shuffle operation. Such a determination may be made when a shuffle operation could be performed faster if a second shuffler component were added. For example, a shuffle master or other component may analyze the shuffle operation and determined that increase parallelization (e.g., adding additional shuffler components) would aid in completing the shuffle operation faster. This analysis may include identifying shuffle operations including multiple data sources or including independent data sets that can be selected and provided in parallel.

Figure 5:
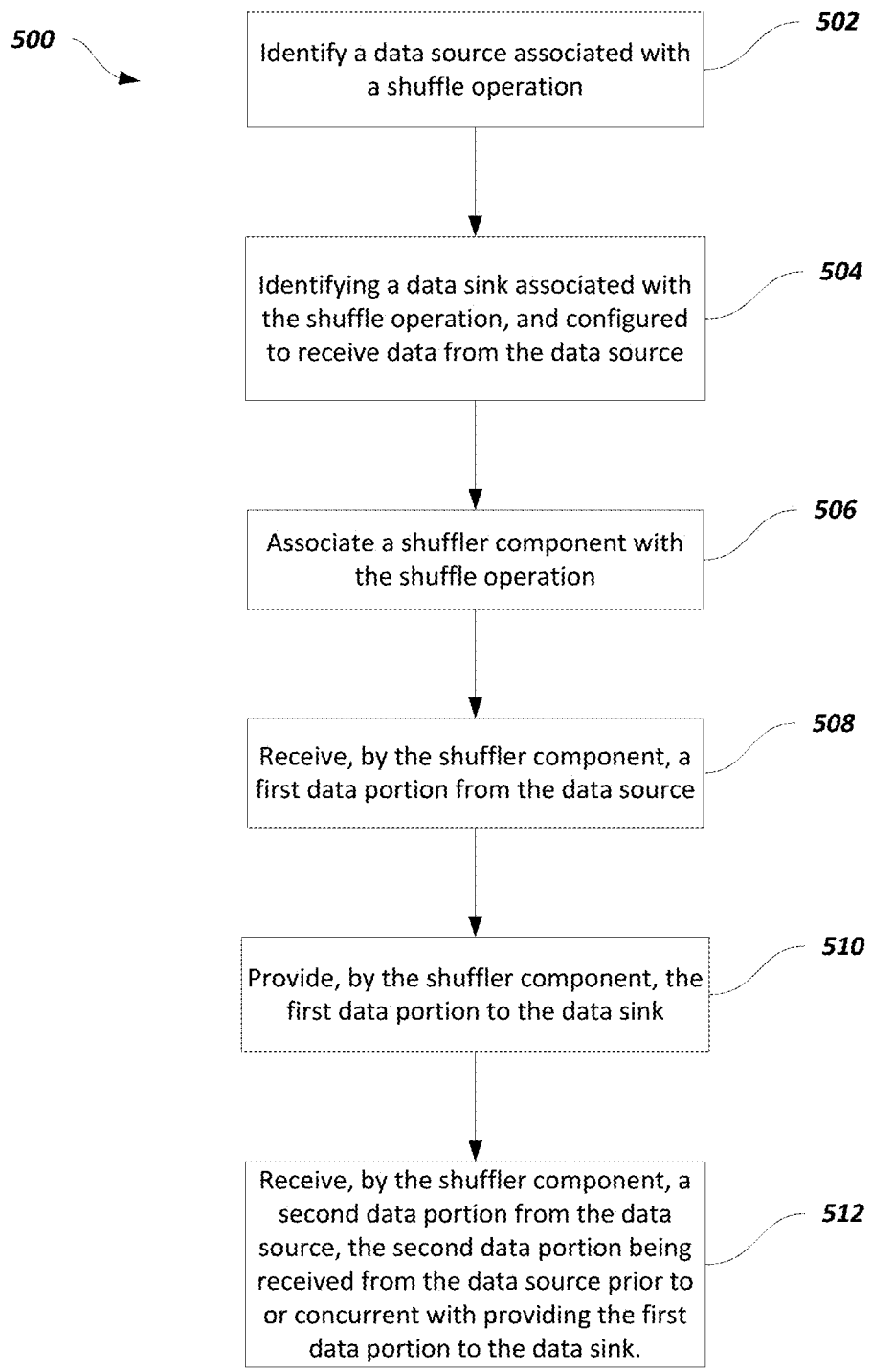
FIG. 5 is a flow chart illustrating an example of a method for overlapping data delivery.

FIG. 5 is a flow chart illustrating an example of a method 500 for overlapping data delivery. Generally, the method 500 involves allowing a data source and data sink to perform send and receive operations associated with the shuffle operation in parallel. At 502, the data source associated with the shuffle operation is identified. At 504, the data sink associated with the shuffle operation and configured to receive data from the data sources identified. At 506, a shuffler component is associated with the shuffle operation.

At 508, the shuffler component receives a first data portion from the data source. In some implementations, the shuffler component receives the first data portion from the data source over a network. The shuffler component may also receive the first data portion from the data source via any other suitable mechanism, such as, for example, by reading from a common database table, by reading a shared memory location, or by any other suitable mechanism.

At 510, the shuffler component provides the first data portion to data sink. In some implementations, the shuffler component may provide the first data portion to the data sink in response to the data sink requesting a next data portion associated with the shuffle operation. The shuffler component may also provide the first data portion to the data sink in response to a request for that specific data portion from the data sink.

At 512, the shuffler component receives a second data portion from the data source, the second data portion being received from the data source prior to or concurrent with providing the first data portion to the data sink. In some implementations, the shuffler component may store the first data portion in a cache until the first data portion is requested by the data sink. The shuffler component may also store the first data portion in an external data storage system, such as data storage system 224 from FIG. 2. In some instances, the shuffle component may be implemented as an asynchronous or multi-threaded software application such that it can perform the actions of providing the first data portion to the data sink and receiving the second data portion from the data source concurrently.

Although the method 500 includes a second data portion being received by the shuffler component prior to or concurrent with providing the first data portion to the data sink, additional data portions may be received by the shuffler component prior to or concurrent with providing the first data portion to the data sink. In some implementations, the data source may provide all data portions associated with the shuffle operation to the shuffler component prior to the shuffler component providing the first data portion to the data sink. Such functionality allows the data source to provide data portions as rapidly as it can without waiting for the data sink to receive those data portions. In some implementations, once the data source has provided all data portions to shuffler component, the data source may be free to service other requests.

Figure 6:
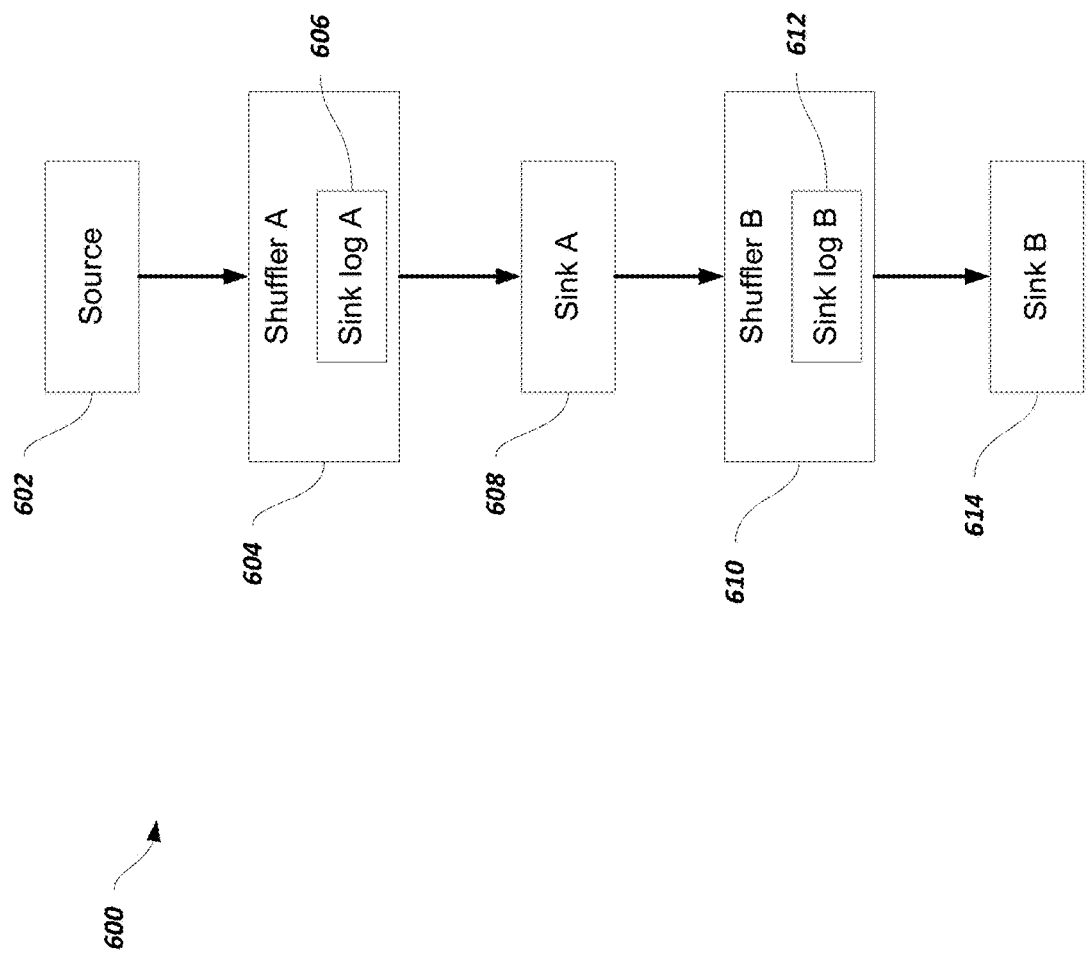
FIG. 6 is a block diagram illustrating an example of a system for performing a shuffle operation including a nested shuffler component.

FIG. 6 is a block diagram illustrating an example of a system 600 for performing a shuffle operation including a nested shuffler component. The system 600 includes a source 602, a first shuffler component 604, and a sink log 606 associated with the shuffler component 604. In some implementations, these components may be implemented by source 302, shuffler component 304, sink log 306, and sink 308 described relative to FIG. 3A. The system 600 also includes a first sink 608, the second shuffler component 610, a second sink log 612 associated with the second shuffler component 610, and a second sink 614. In the illustrated implementation, the sink 608 receives data from the first shuffler component 604 as described previously with respect to FIG. 2. The second sink 608 then provides this data to the second shuffler component 610, where it is stored in second sink log 612. The second sink 614 then receives the data from the second shuffler component 610 as described previously with respect to FIG. 2. This "nesting" of shuffler components, where the first shuffler component 604 is, in effect, providing data to the second shuffler component 610, may allow for increased flexibility and greater overlap of operations between the different components. For example, the nesting of shuffler components allows for the construction of complex data pipelines with operations being performed on the data at intermediate steps in between the nested shufflers. The nesting of shuffler components also allows for greater overlap of operations between components by increasing the number of components in the pipeline. As each of these components may be concurrently processing data associated with the pipeline, greater concurrency and overlap of operations is obtained.

In some implementations, the sink 608 performs computations, transformations, or other operations on the data received from the first shuffler component 604 prior to providing the data to the second shuffler component 610. This may allow intermediate analysis to be performed on data as it is produced from a data source. In some implementations, the sink 608 may examine each chunk of data received from the shuffler component 604, and filter or delete certain chunks instead of sending them to the second shuffler component 610. For example, the sink 608 may compare each chunk to an external or local data store to determine whether the chunk should be filtered. The sink 608 determines that the chunk should be filtered, sink 608 will discard the chunk and not provide it to the shuffler component 610.

In some implementations, the source 602 and the first shuffler component 604 are associated with a first shuffle operation, the second shuffler component 610 and the second sink 614 are associated with a second shuffle operation, and the first sink 608 is associated with both shuffle operations. The entire system 600 may also be associated with a single shuffle operation.

Figure 7:
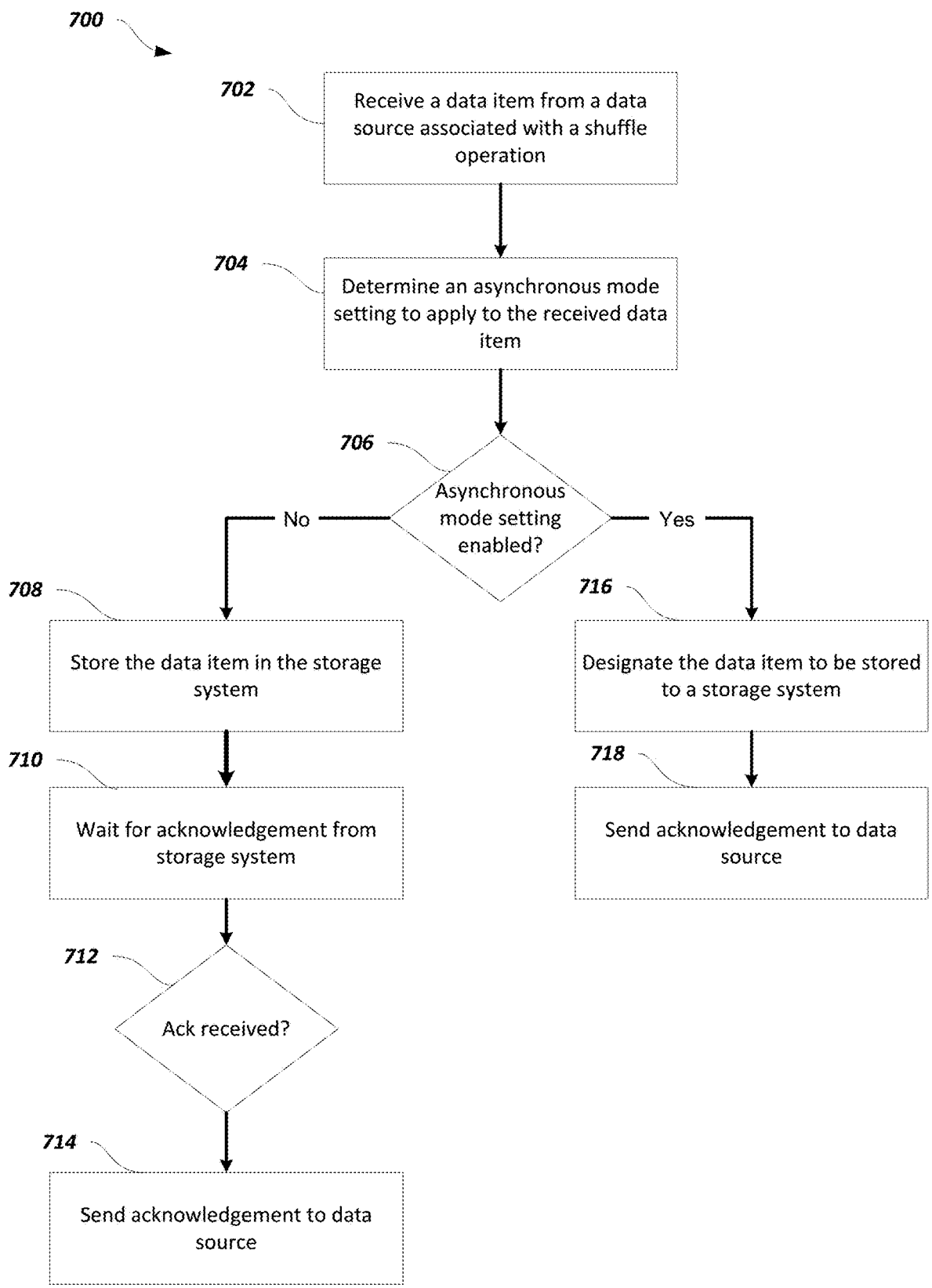
FIG. 7 is a flow chart illustrating an example of a method for storing and responding to a received data item.

FIG. 7 is a flow chart illustrating an example of a method 700 for storing and responding to a received data item. The method 700 illustrates functionality associated with different asynchronous mode settings. If asynchronous mode is enabled, a received data item is acknowledged to a data source before it is completely written to a storage system. If asynchronous is disabled, the received data item is acknowledged to the data source after it is completely written to the storage system. In some implementations, the data item is received by shuffler component and acknowledged to the data source by the shuffler component after the data item is written to persistent storage.

At 702, a data item is received from a data source associated with a shuffle operation. At 704, an asynchronous mode setting is determined for the received data item. In some implementations, an asynchronous mode setting is a global setting that affects all received data items. The asynchronous mode setting may also be associated with a shuffle operation, or with an individual shuffler component associated with the shuffle operation.

At 706, the method branches on whether the asynchronous mode setting is enabled. If the asynchronous mode setting is not enabled, the method proceeds to 708, where the data item is stored in a storage system. In some implementations, the data item may be stored to a local storage system, such as a hard drive or RAM. The data item may also be stored to an external storage system such as a cloud storage system, a distributed database system, or distributed file system.

At 710, the shuffler component waits for an acknowledgment from storage system. At 712, the method 700 branches based on whether an acknowledgment has been received from the storage system. If the acknowledgment has not been received, the method 700 returns to 710. If acknowledgment has been received, the method proceeds to 714, where an acknowledgment is sent to the data source.

Referring again to 706, if the asynchronous mode setting is enabled, the method 700 proceeds to 716, where the data item is designated to be stored to the storage system. In some implementations, designating the item to be stored to the storage system includes writing the data item to a buffer which will be written to the storage system at some point in the future. Designating the data item may also include sending a message to the storage system instructing it to store the data item. In some instances, 716 may be omitted, and the method 700 may proceed directly to 718.

At 718, an acknowledgment is sent to the data source. Note that, conversely to the branch of the method 700 beginning at 708, the acknowledgment is sent to the data source at 718 without waiting for the data to be stored to the storage system. By acknowledging the data item to the data source prior to storing the data item in the storage system, the method 700 may obtain greater performance, as the data source need not wait for a potentially slow storage operation to take place prior to sending its next data item.

In some implementations, the asynchronous mode setting may be adjusted during a shuffle operation. For example, the data source may send an indication to a shuffler component that the asynchronous mode setting should be set to disabled. In response to this, the shuffler component may store any stored data portions to the storage system, and acknowledge a data portion associated with the indication only when all data portions have been successfully written to the storage system.

Figure 8:
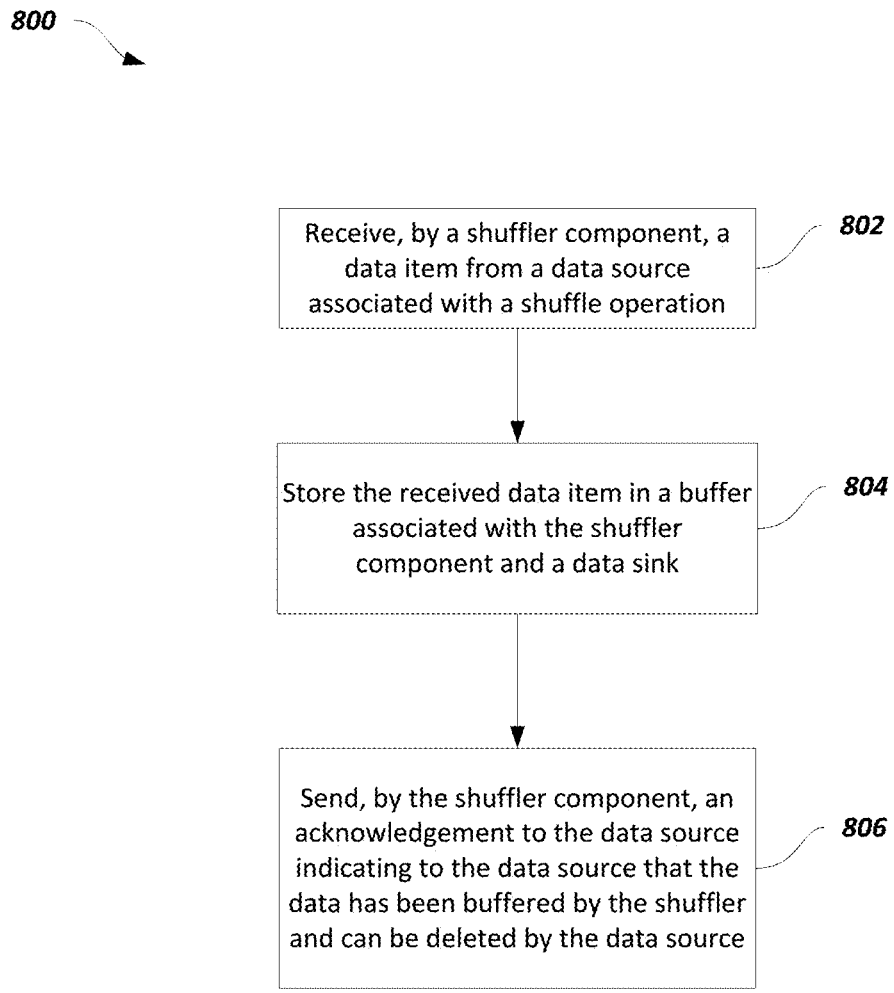
FIG. 8 is a flow chart illustrating an example of a method for buffering received data items by a shuffler component.

FIG. 8 is a flow chart illustrating an example of a method 800 for buffering received data items by a shuffler component. At 802, a shuffler component receives the data item from a data source associated with the shuffle operation. At 804, the received data item is stored in a buffer associated with the shuffler component and a data sink. In some implementations, the buffer is a sink log. The buffer may also be in a storage system local to the shuffler component, such as RAM, or an external system such as a cloud storage system. At 806, the shuffler component sends an acknowledgment to the data source indicating that the data has been buffered by the shuffler component and can be deleted by the data source. In some cases, buffering data at the shuffler component may provide increased reliability as a shuffle operation can more easily recover from a data source failure.

Figure 9:
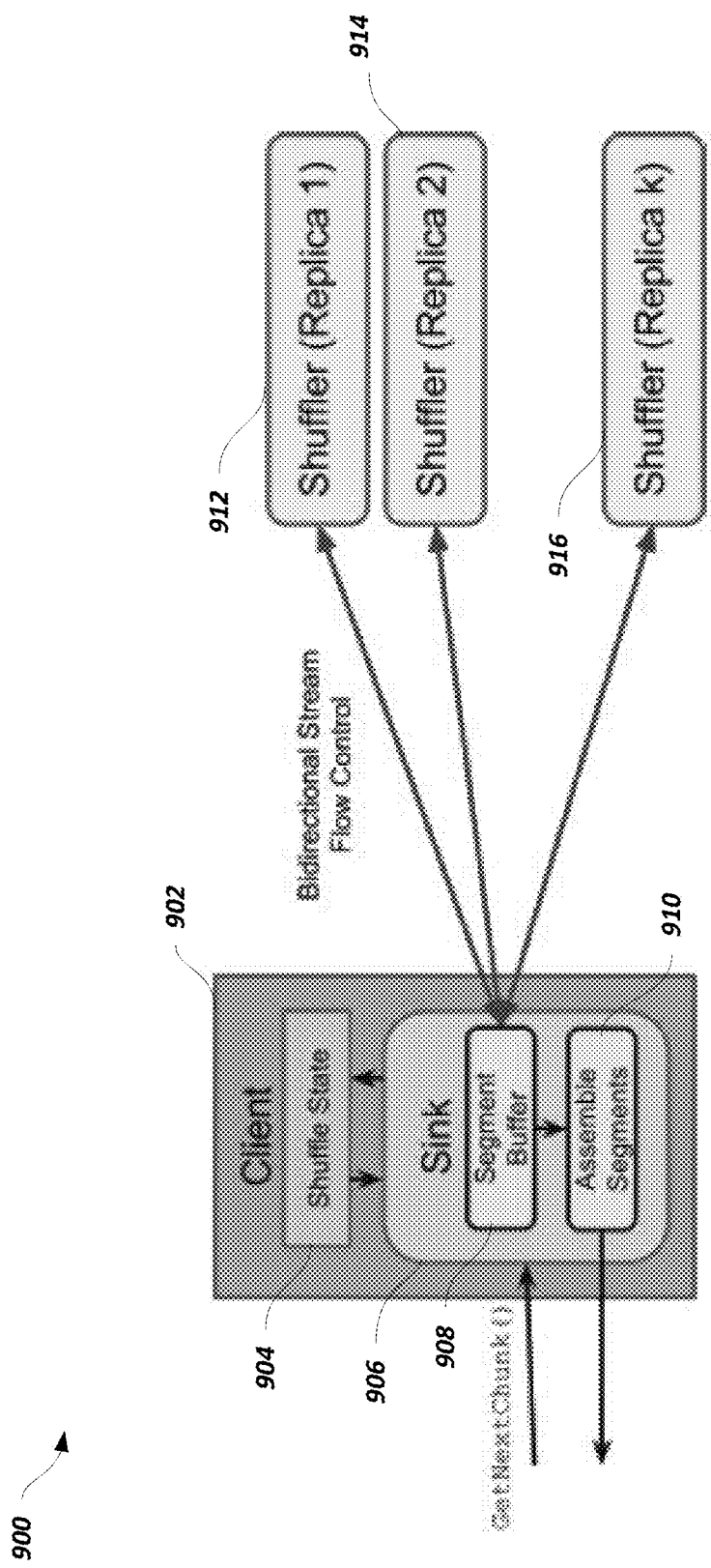
FIG. 9 is a block diagram illustrating an example of a system including multiple sink log replicas.

FIG. 9 is a block diagram illustrating an example of a system 900 including multiple sink log replicas 912, 914, 916. The system 900 also includes a client 902. The client 902 includes a shuffle state 904, a sink 906, a segment buffer 908, and a set of assembled segments 910. In operation, the sink 906 reads data from the sink log replicas 912, 914, 916 and assemble the data into a single stream. The sink 906 uses information collected by the client 902 to determine the current state 904 of the sink logs. In some implementations, the current state 904 includes the number of active sink log replicas and the shuffler components responsible for them. The client 902 may be notified when the state of the shuffle operation changes and may update the shuffle state 904 accordingly. Once the sink 906 becomes aware of a sink log replica, it maintains a bidirectional flow-control stream 920 to the shuffler component responsible for the replica. The bi-directional stream flow control stream 920 is used by the sink 906 to notify the shuffler component if it is not able to receive data. For example, if the segment buffer 908 is full, the sink 906 may send a message to the shuffler component associated with sink log replica 916 indicating that it cannot receive any more data.

Figure 10:
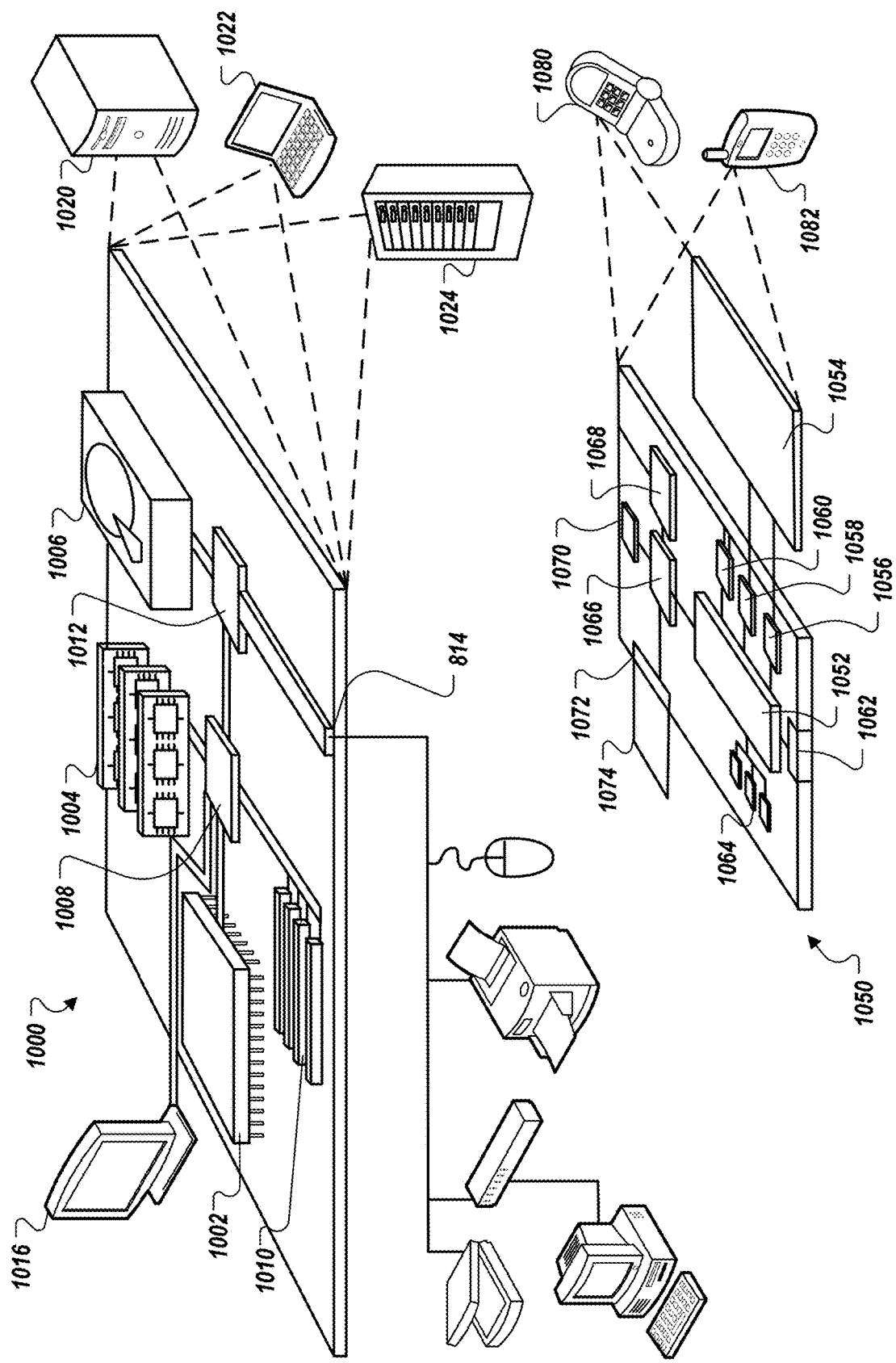
FIG. 10 is a block diagram of computing devices that may be used to implement the systems and methods described in this document, as either a client or as a server or plurality of servers.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. Additionally, computing device 1000 or 1050 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Implementations of the present disclosure and all of the functional operations described in this specification can be implemented in digital electronic circuitry, or in computer software, firmware, or hardware, including the structures disclosed in this specification and their structural equivalents, or in combinations of one or more of them. Implementations of the present disclosure can be implemented as one or more computer program products, e.g., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can be any form of sensory feedback, e.g., visual feedback, auditory feedback, or tactile feedback and input from the user can be received in any form, including acoustic, speech, or tactile input.

Implementations of the present disclosure can be implemented in a computing system that includes a back-end component, e.g., as a data server, or that includes a middle-ware component, e.g., an application server, or that includes a front-end component, e.g., a client computer having a graphical user interface or a Web browser through which a user can interact with an implementation of the present disclosure, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the present disclosure or of what may be claimed, but rather as descriptions of features specific to particular implementations of the present disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

What is claimed is:

1. A computer-implemented method, comprising:
   receiving, from a distributed database application, a request that a shuffle operation execute on a data set associated with the shuffle operation and stored in a distributed database;
   identifying, based on the shuffle operation, a data source configured to provide the data set associated with the shuffle operation;
   identifying, based on the shuffle operation, a data sink configured to receive the data set;
   configuring a first shuffler component that includes a first cache configured to receive the data set associated with the shuffle operation from the data source and provide the data set associated with the shuffle operation to the data sink;
   determining a performance of the first shuffler component fails to satisfy a performance threshold;
   in response to determining the performance of the first shuffler component fails to satisfy the performance threshold, configuring a second shuffler component that includes a second cache configured to receive the data set associated with the shuffle operation from the data source and provide the data set associated with the shuffle operation to the data sink;
   storing a first portion of the data set received from the data source in the second cache of the second shuffler component;
   providing, based on the configuration of the second shuffler component, the first portion of the data set associated with the shuffle operation from the second cache of the second shuffler component to the data sink; and
   storing a second portion of the data set received from the data source in the second cache of the second shuffler component concurrently with the second shuffler component providing the first portion of the data set to the data sink from the second cache of the second shuffler component.

2. The computer-implemented method of claim 1, wherein the data source comprises a plurality of data sources and the data sink comprises a plurality of data sinks.

3. The computer-implemented method of claim 1, further comprising:
   receiving a plurality of additional portions of the data set from the data source in the second cache of the second shuffler component; and
   providing the plurality of additional portions of the data set from the second cache of the second shuffler component to the data sink, wherein providing the plurality of additional portions of the data set at least partially overlaps with receiving the plurality of additional portions of the data set.

4. The computer-implemented method of claim 1, further comprising receiving a final portion of the data set from the data source in the second cache of the second shuffler component prior to providing the first portion of the data set to the data sink.

5. The computer-implemented method of claim 1, further comprising providing the first portion of the data set from the second cache of the second shuffler component to a second data sink.

6. The computer-implemented method of claim 1, further comprising:
receiving, flat the second shuffler component, a flow control indication from the data sink; and
in response to receiving the flow control indication, suspending the second cache of the second shuffler component providing the first portion and the second portion of the data set to the data sink.

7. The computer-implemented method of claim 6, further comprising:
receiving, flat the second shuffler component, a flow resume indication from the data sink; and
in response to receiving the flow resume indication, resuming the second cache of the second shuffler component providing the first portion and the second portion of the data set to the data sink.

8. The computer-implemented method of claim 1, wherein a determining the performance of the first shuffler component fails to satisfy the performance threshold comprises determining a memory usage of the first shuffler component fails to satisfy a memory usage threshold.

9. The computer-implemented method of claim 1, wherein the data set comprises database records in a set of database records.

10. The computer-implemented method of claim 1, further comprising configuring a third shuffler component that includes a third cache configured to receive the data set associated with the shuffle operation from the data source and provide the data set associated with the shuffle operation to the data sink in parallel with the second shuffler component receiving the data set associated with the shuffle operation from the data source and providing the data set associated with the shuffle operation to the data sink.

11. A system comprising:
one or more computers and one or more storage devices storing instructions that are operable, when executed by the one or more computers, to cause the one or more computers to perform operations comprising:
receiving, from a distributed database application, a request that a shuffle operation execute on a data set associated with the shuffle operation and stored in a distributed database;
identifying, based on the shuffle operation, a data source configured to provide the data set associated with the shuffle operation;
identifying, based on the shuffle operation, a data sink configured to receive the data set;
configuring a first shuffler component that includes a first cache configured to receive the data set associated with the shuffle operation from the data source and provide the data set associated with the shuffle operation to the data sink;
determining a performance of the first shuffler component fails to satisfy a performance threshold;
in response to determining the performance of the first shuffler component fails to satisfy the performance threshold, configuring a second shuffler component that includes a second cache configured to receive the data set associated with the shuffle operation from the data source and provide the data set associated with the shuffle operation to the data sink;
storing a first portion of the data set received from the data source in the second cache of the second shuffler component;
providing, based on the configuration of the second shuffler component, the first portion of the data set associated with the shuffle operation from the second cache of the second shuffler component to the data sink; and
storing a second portion of the data set received from the data source in the second cache of the second shuffler component concurrently with the second shuffler component providing the first portion of the data set to the data sink from the second cache of the second shuffler component.

12. The system of claim 11, wherein the data source comprises a plurality of data sources and the data sink comprises a plurality of data sinks.

13. The system of claim 11, wherein the operations further comprise:
receiving a plurality of additional portions of the data set from the data source in the second cache of the second shuffler component; and
providing the plurality of additional portions of the data set from the second cache of the second shuffler component to the data sink, wherein providing the plurality of additional portions of the data set at least partially overlaps with receiving the plurality of additional portions of the data set.

14. The system of claim 11, wherein the operations further comprise receiving a final portion of the data set from the data source in the second cache of the second shuffler component prior to providing the first portion of the data set to the data sink.

15. The system of claim 11, wherein the operations further comprise providing the first portion of the data set from the second cache of the second shuffler component to a second data sink.

16. The system of claim 11, wherein the operations further comprise:
receiving, by flat the second shuffler component, a flow control indication from the data sink; and
in response to receiving the flow control indication, suspending the second cache of the second shuffler component providing the first portion and the second portion of the data set to the data sink.

17. The system of claim 16, wherein the operations further comprise:
receiving, flat the second shuffler component, a flow resume indication from the data sink; and
in response to receiving the flow resume indication, resuming the second cache of the second shuffler component providing the first portion and the second portion of the data set to the data sink.

18. The system of claim 11, wherein determining the performance of the first shuffler component fails to satisfy the performance threshold comprises determining a memory usage of the first shuffler component fails to satisfy a memory usage threshold.

19. The system of claim 11, wherein the data set comprises database records in a set of database records.

20. A non-transitory computer-readable medium storing software comprising instructions executable by one or more computers which, upon such execution, cause the one or more computers to perform operations comprising:

receiving, from a distributed database application, a request that a shuffle operation execute on a data set associated with the shuffle operation and stored in a distributed database;

identifying, based on the shuffle operation, a data source configured to provide the data set associated with the shuffle operation;

identifying, based on the shuffle operation, a data sink configured to receive the data set;

configuring a first shuffler component that includes a first cache configured to receive the data set associated with the shuffle operation from the data source and provide the data set associated with the shuffle operation to the data sink;

determining a performance of the first shuffler component fails to satisfy a performance threshold;

in response to determining the performance of the first shuffler component fails to satisfy the performance threshold, configuring a second shuffler component that includes a second cache configured to receive the data set associated with the shuffle operation from the data source and provide the data set associated with the shuffle operation to the data sink;

storing a first portion of the data set received from the data source in the second cache of the second shuffler component;

providing, based on the configuration of the second shuffle component, the first portion of the data set associated with the shuffle operation from the second cache of the second shuffler component to the data sink; and storing a second portion of the data set received from the data source in the second cache of the second shuffler component concurrently with the second shuffler component providing the first portion of the data set to the data sink from the second cache of the second shuffler component.

\* \* \* \* \*